(12) United States Patent
Zhang (10) Patent No.: US 10,747,387 B2
(45) Date of Patent: Aug. 18, 2020

(54) METHOD, APPARATUS AND USER TERMINAL FOR DISPLAYING AND CONTROLLING INPUT BOX (71) Applicant: Alibaba Group Holding Limited, Grand Cayman (KY)

(72) Inventor: Huijun Zhang, Guangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 15/840,577

(22) Filed: Dec. 13, 2017

(65) Prior Publication Data
US 2018/0164954 A1 Jun. 14, 2018

(30) Foreign Application Priority Data
Dec. 13, 2016 (CN) .......................... 2016 1 1146705

(51) Int. Cl.
G06F 3/0481 (2013.01)
G06F 3/0488 (2013.01)

(52) U.S. Cl.
CPC ........ G06F 3/0481 (2013.01); G06F 3/04886 (2013.01); G06F 3/0488 (2013.01); G06F 2203/04808 (2013.01)

(58) Field of Classification Search
CPC ... G06F 3/0481; G06F 3/04886; G06F 3/0488
See application file for complete search history.

(56) References Cited

U.S. PATENT DOCUMENTS

| 8,499,258 | B1* | 7/2013 | Cho | G06F 3/04883 715/773 |
| 2010/0241983 | A1* | 9/2010 | Walline | G06F 1/1626 715/773 |
| 2011/0175826 | A1* | 7/2011 | Moore | G06F 3/04886 345/173 |
| 2013/0106898 | A1* | 5/2013 | Saint-Loubert-Bie | G06F 1/1626 345/592 |
| 2013/0111391 | A1* | 5/2013 | Penner | G06F 3/04886 715/773 |
| 2013/0113741 | A1* | 5/2013 | Kim | G06F 3/0488 345/173 |
| 2013/0283195 | A1* | 10/2013 | Bilgen | G06F 3/0485 715/767 |

(Continued)

Primary Examiner — Tadesse Hailu
(74) Attorney, Agent, or Firm — Alston & Bird LLP (57) ABSTRACT The present invention provides a method, an apparatus and a user terminal for displaying and controlling an input box. The method for displaying and controlling an input box includes: hiding an input box of an operation interface in response to a user's touch operation; displaying or collapsing an input area in the operation interface; and re-displaying the input box according to the input area displayed or collapsed. The method, the apparatus and the user terminal for displaying and controlling an input box provided in the present invention, in the case when the input area is popped up or collapsed, allows the input box to interact properly with the input area, so as to avoid the operation interface, during the course of displaying or collapsing the input area, from being compressed or shifted in response due to the influence from the operation interface, thereby improving the user experience.

9 Claims, 5 Drawing Sheets (56) References Cited

U.S. PATENT DOCUMENTS

| | | | |
|---|---|---|---|
| 2013/0298071 A1* | 11/2013 | Wine | G06F 3/04883 715/780 |
| 2014/0313218 A1* | 10/2014 | Lee | G09G 5/10 345/589 |
| 2015/0095833 A1* | 4/2015 | Kim | G06F 3/04886 715/773 |
| 2015/0277758 A1* | 10/2015 | He | G06F 3/04886 715/773 |
| 2015/0312182 A1* | 10/2015 | Langholz | H04L 51/04 715/753 |

* cited by examiner

METHOD, APPARATUS AND USER TERMINAL FOR DISPLAYING AND CONTROLLING INPUT BOX

CROSS-REFERENCE TO RELATED APPLICATION

The present invention claims priority to and benefit of Chinese Patent Application No. 201611146705.X, filed with the State Intellectual Property Office (SIPO) of the People's Republic of China on Dec. 13, 2016, the entire content of which is incorporated by reference into the present application.

TECHNICAL FIELD

The present invention relates to the field of computer technology. More specifically, it related to a method, an apparatus and a user terminal for displaying and controlling an input box.

BACKGROUND ART

At present, in most Android applications, the interactions of the input box and the system are separated. The input area comes with the system and the third-party input area each is an independent application. As a result, the input box of an application is unable to interact and cooperate with the input area in the case when the input area is popped-up or collapsed, which further leads to a poor user experience. For example, after the input area is popped up, in order to solve the problem that the input area may block the input box, most of the existing Android systems employ the scheme of shifting the entire interface or adjusting the size of the interface (equivalent to the interface being compressed). However, when employing the foregoing solution, when the input area is popped up, input box will be pushed up from the bottom of the interface or the interface will be compressed, both of which will compromise the user experience.

Therefore, the problem regarding how to provide a better interaction solution to achieve a desired interaction between the input box and the input area in the case when the input area is popped up or collapsed, so as to improve the user experience is a problem demanding a prompt solution in the existing technology.

SUMMARY OF INVENTION

In a first aspect, one or more embodiments of the present invention provide a method for displaying and controlling an input box, which is applicable in a user terminal with a touch screen, and the method for displaying and controlling an input box includes:

hiding an input box of an operation interface in response to a user's touch operation;

displaying or collapsing an input area in the operation interface;

re-displaying the input box according to the displayed or collapsed input area.

In a second aspect, one or more embodiments of the present invention provide an apparatus for displaying and controlling an input box, which is applicable in a user terminal with a touch screen, and the apparatus for displaying and controlling an input box includes:

a hiding module, which is used for hiding an input box of an operation interface in response to a user's touch operation;

a first execution module, which is used for displaying or collapsing an input area in the operation interface;

a second execution module, which is used for re-displaying the input box according to the displayed or collapsed input area.

In a third aspect, one or more embodiments of the present invention provide a user terminal, and the user terminal includes:

a memory;

a processor; and an apparatus for displaying and controlling an input box, wherein the apparatus for displaying and controlling an input box is installed in the memory and comprises one or more software functional modules executed by the processor, the apparatus for displaying and controlling an input box comprises:

a hiding module, which is used for hiding an input box of an operation interface in response to a user's touch operation;

a first execution module, which is used for displaying or collapsing an input area in the operation interface;

a second execution module, which is used for re-displaying the input box according to the displayed or collapsed input area.

With respect to the existing technology, the method, apparatus and user terminal for displaying and controlling an input box provided in the present invention has the following advantageous effects:

The method, the apparatus and the user terminal for displaying and controlling an input box provided in the present invention, in the case when the input area is popped up or collapsed, allows the input box to interact properly with the input area, so as to avoid the operation interface, during the course of displaying or collapsing the input area, from being compressed or shifted in response due to the influence from the operation interface, thereby improving the user experience.

The above objects, features and advantages of the present invention will become clearer based on the following detailed description of certain preferred embodiments of the present invention in reference to the accompanying drawings.

BRIEF DESCRIPTION OF DRAWINGS

To describe the technical solutions of the embodiments of the present invention more clearly, the drawings used in the embodiments of the present invention will be described briefly. However, it is to be understood that the following drawings merely illustrate some embodiments of the present invention, and therefore should not be considered as limit the scope of the present invention. For those skilled in the art, other related drawings may also be obtained based on these drawings provided herein without any creative work.

Element numerals: 100—user interface, 101—input box, 102—input area, 110—apparatus for displaying and controlling an input box, 111—determination module, 112—response module, 113—hiding module, 114—generation module, 115—first execution module, 116—first moving module, 117—second moving module, 118—second execution module, 120—memory, 130—memory controller, 140—processor, 150—peripheral interface, 160—radio frequency (RF) module, 170—audio module, 180—touch screen, 200—server, 300—network

DESCRIPTION OF EMBODIMENTS

The technical solutions in the embodiments of the present invention will be clearly and completely described below with reference to the accompanying drawings of the embodiments of the present invention. Apparently, the described embodiments are merely some but not all of the embodiments of the present invention. The components of the embodiments of the present invention, generally described and illustrated in the figures herein, may be arranged and designed in a wide variety of different configurations. Accordingly, the following detailed description of the embodiments of the invention provided in reference to the accompanying drawings is not intended to limit the scope of the present invention to be protected, but merely to illustrate certain selected embodiments of the present invention. All other embodiments obtained by a person skilled in the art based on the embodiments of the present invention without creative efforts shall fall within the scope for protection of the present invention.

It should be noted that similar reference numbers and letters represent similar terms in the following figures, and therefore, once an element is defined in a figure, the same element does not need to be further defined or explanted in any subsequent drawings. In the meantime, in the description of the present invention, the terms "first", "second" and the like are only used to distinguish descriptions, and should not be understood as indicating or implying any relative importance.

Figure 1:
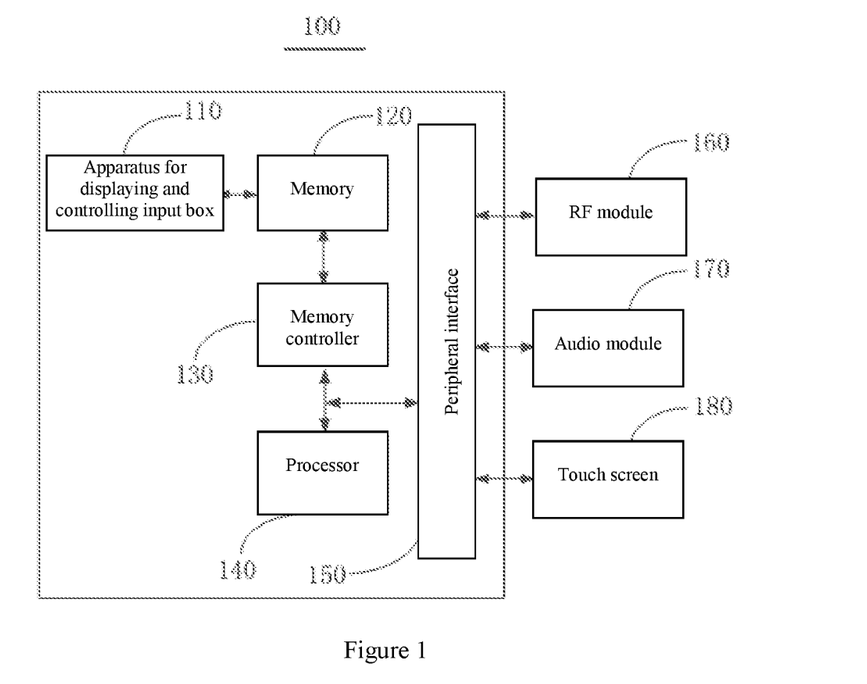
FIG. 1 is a block diagram of a user terminal provided in one or more preferred embodiment of the present invention.

FIG. 1 shows a schematic block view of a user terminal 100 that can be used in one or more embodiments of the present invention. As shown in FIG. 1, the user terminal 100 includes an apparatus for displaying and controlling an input box 110, a memory 120, a memory controller 130, a processor 140, a peripheral interface 150, a RF module 160, an audio module 170, a touch screen 180, and so on. These components communicate with each other via one or more communication buses/signal lines.

The memory 120 can be configured to store software programs and modules, such as the program instructions/modules corresponding to the method, apparatus and user terminal for displaying and controlling an input box provided in one or more embodiments of the present invention. The processor 140 is able to execute various functional applications and data processing through the software programs and modules stored in the memory 120. For example, the method for displaying and controlling an input box provided in one or more embodiments of the present invention.

The memory 120 may include a high-speed random access memory, and may further include non-volatile memory such as one or more magnetic storage devices, flash memory, or other non-volatile solid-state memory. Access by the processor 140 and other possible components to the memory 120 may be under the control of the memory controller 130.

The peripheral interface 150 couples various input/input devices to the processor 140 and the memory 120. In some embodiments, the peripheral interface 150, the processor 140, and the memory controller 130 may be implemented in a single chip. In other cases, they may be implemented by separate chips.

The RF module 160 is used to receive and transmit electromagnetic waves, and achieve mutual conversions between electromagnetic waves and electric signals, so as to communicate with a communication network or other devices.

The audio module 170 provides the user with an audio interface that may include one or more microphones, one or more speakers, and audio circuits.

The touch screen 180 provides an output and input interface simultaneously between the user terminal 100 and the user. In this embodiment, the touch screen 180 supports both single-point and multi-touch operations. For example, the touch screen 180 may be a capacitive touch screen or a resistive touch screen that supports single-point and multi-touch operations. The support for single-point and multi-touch operations refers to that the touch screen 180 can sense touch operations generated from one or more locations simultaneously on the touch screen, and the sensed multi-touch operations are then processed by the processor 140.

In one or more embodiments of the present invention, the user terminal 100 is a mobile terminal device with a touch screen; for example, it may be a smart phone, a tablet computer, an e-book reader, a portable computer, an on-vehicle computer, a wearable mobile terminal, and the like.

It is understood that the structure shown in FIG. 1 is merely illustrative and that the user terminal 100 may further include more or less components than that shown in FIG. 1 or have a different configuration from that shown in FIG. 1. The components shown in FIG. 1 may be implemented in hardware, software, or a combination thereof.

The method, apparatus and user terminal for displaying and controlling an input box provided in one or more embodiments of the present invention provide a new method for control the interaction of operation interface. The method, apparatus and user terminal for displaying and controlling an input box are applicable to platforms such as Android operating system, iOS operating system and Windows Phone operating system. Specifically, the method, apparatus and user terminal for displaying and controlling an input box provided in one or more embodiments of the present invention can be applied to an application (such as a UC browser, a WeChat, a Tencent QQ, and the like), so as to perform switch and control operations with the input area of the operation interface (such as the home page of a browser) of a log on application program. In which the input area may be a soft keyboard or a blank area, where the soft keyboard is used for a user to input characters, numbers, and so on. The blank area is used for receiving a user's touch signal to generate characters, numbers and so on.

Figure 2:
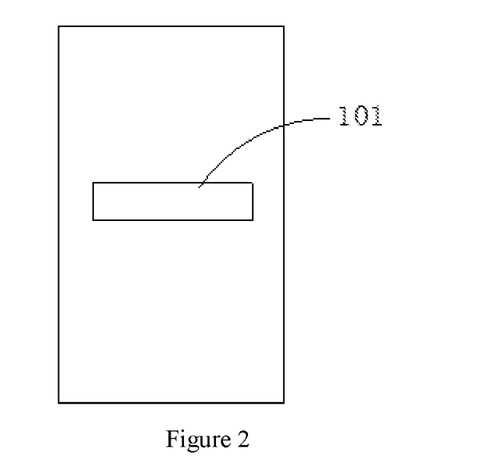
FIG. 2 is a schematic view of an operation interface of a log on application for a user terminal provided in one or more preferred embodiment of the present invention.
Figure 3:
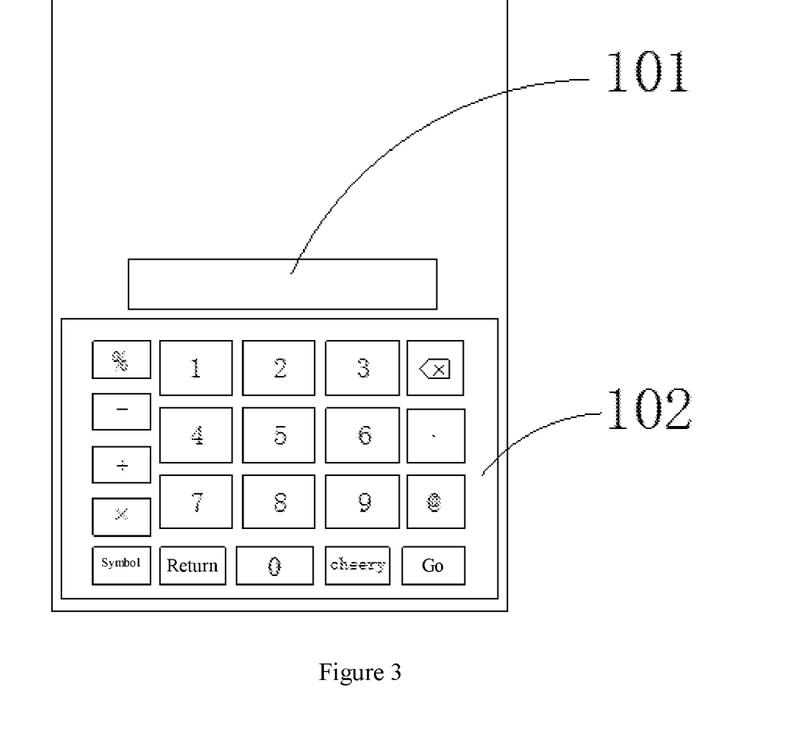
FIG. 3 is a schematic view of another operation interface of a log on application for a user terminal provided in one or more preferred embodiment of the present invention.

As shown in FIGS. 2 and 3, the operation interface is displayed when the user terminal 100 logs onto a browser. As shown in FIG. 2, when no input area is displayed, the operation interface includes an input box 101 for inputting content and other areas besides the input box 101, and at least one control element responding to a touch operation is provided in the area where the input box 101 is located. As shown in FIG. 3, when the input area 102 is displayed, the operation interface includes an input box 101 for inputting content, an input area 102, and other areas outside the input box 101 and the input box 101, in addition, at least one control element responding to a touch operation is provided in the area other than the input box 101 and the input area 102. When the input area 102 is not displayed, the input area 102 can be displayed by clicking on the control element provided in the area where the input box 101 is located. When the input area 102 is displayed, the input area 102 can be collapsed by way of clicking on the control element provided in the area outside the input area 101 and the input area 102.

First Embodiment

Figure 4:
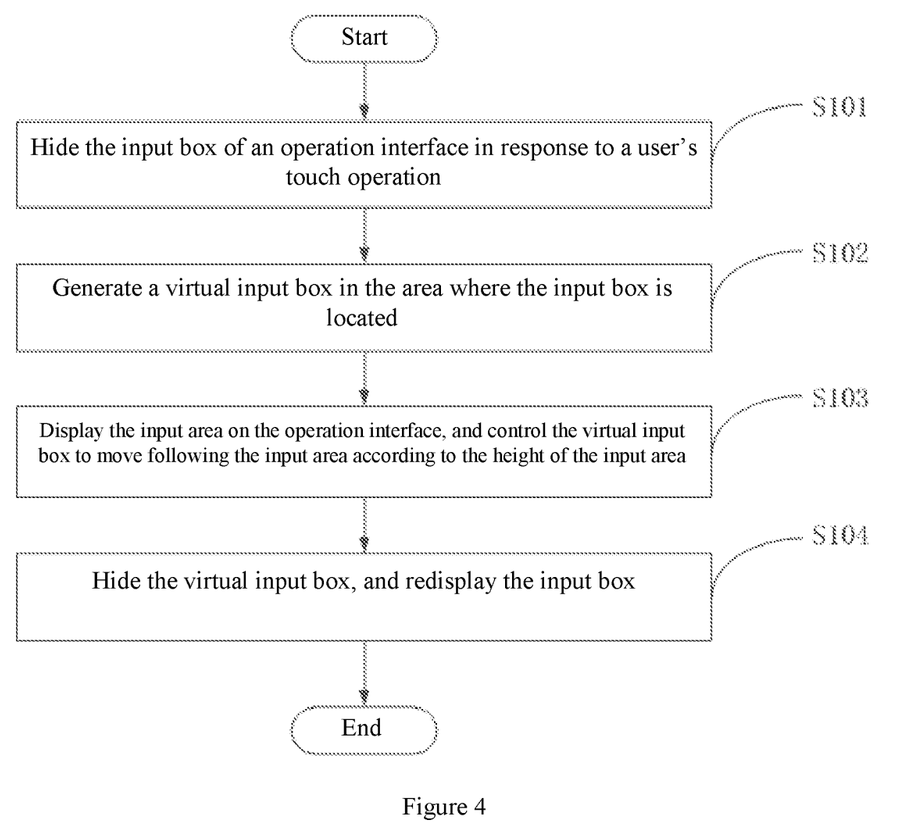
FIG. 4 is a flow chart of the method for displaying and controlling an input box provided in a first embodiment of the present invention.

In reference to FIG. 4, which is a flow chart of the method for displaying and controlling an input box provided in one embodiment of the present invention, it can be seen that the method provided in this embodiment is applicable to a scenario in which the input area 102 of the operation interface is in a collapsed state. The specific process shown in FIG. 4 will be described in detail below.

Step S101, hide the input box 101 of an operation interface in response to a user's touch operation.

Specifically, after the application is logged in, an operation interface for interacting with the user is displayed on the touch screen 180 of the user terminal 100. In this case, the input area 102 is in a collapsed state. When the user touches the input box 101 in the operation interface, the user terminal 100 responds to the touch operation and hides the input box 101.

In this embodiment of the present invention, the touch operation with the input box 101 on the operation interface may be performed by single clicking or double clicking the input box 101 on the operation interface, alternatively, it may be performed by pressing the input box 101 on the operation interface for a relatively long period of time; alternatively, it may be performed by sliding on the area of the input box 101, and so on. It is noted that there is no any specific limitation in the embodiments of the present invention.

As a preferred embodiment, in the embodiments of the present invention, before responding to a user's touch operation, the user terminal 100 may first determine whether the user interface has enabled the dynamic keyboard function. Only if the dynamic keyboard function is enabled on the operation interface, the user terminal 100 responds to the user's touch operation.

Step S102, generate a virtual input box in the area where the input box 101 is located.

After the input box 101 is hidden, the user terminal 100 generates a virtual input box consistent with the original hidden input box 101 in size, shape, color, and so on, in the area where the input box 101 hidden by the operation interface is located; the virtual input box cannot be used for inputting a content, while its displaying effect is consistent with the hidden input box 101. The virtual input box is used to display to the user for the hidden input box 101. The visual effect of the virtual input box is completely the same as the visual effect of the hidden input box 101.

Step S103, display the input area 102 on the operation interface, and control the virtual input box to move following the input area 102 according to the height of the input area 102.

After the virtual input box is generated, the user terminal 100 displays an input area 102 for user input on the operation interface. The process of displaying the input area 102 may be a process in which the input area is displayed in a specific area of the operation interface in a way of sliding pop-up or color gradient deepening. For example, the input area 102 is popped-up from the bottom or one side of the operation interface and then displayed in the bottom area of the operation interface.

Since the input box 101 has been hidden, in the process of displaying the input area 102, the user terminal 100 determines that the input area 102 will not block the input box 101. Therefore, when the input area 102 is displayed, the operation interface will not have an issue of compression or shift in response.

When the input area 102 has been displayed or is being displayed, the user terminal 100 may obtain the height of the input area 102, and immediately control the virtual input box to dynamically follow the displayed input area 102 to move to a predetermined area through a smooth animation, where the predetermined area is an area outside the input area 102 on the operation interface. Preferably, the predetermined area is an area on the operation interface that is close to the top of the input area 102.

Step S104, hide the virtual input box, and redisplay the input box 101.

After the virtual input box moves to the predetermined area, the user terminal 100 hides the virtual input box and redisplays the previously hidden input box 101 on the operation interface. The area for redisplaying the hidden input box 101 is the same as the predetermined area to which the virtual input box is moved. Thus, regarding its virtual effect, the input box 101 seems to smoothly move from the original area to the predetermined area.

For example, the original input box 101 in the operation interface is located at the bottom of the operation interface. When a user touches the input box 101 in the operation interface, the input box 101 at the bottom of the operation interface is hidden, and a virtual input box, which corresponds to the hidden input box 101 in size, shape, color, and the like, is generated in the area where the hidden input box 101 is located. Then, the input area 102 pops upwards from the bottom of the operation interface. Since the input box 101 has been hidden, during the process of displaying the input area 102, the user terminal 100 determines that the input area 102 will not block the input box 101. Accordingly, when the input area 102 is displayed, the user interface will not have the issue of being compressed or shifted in response.

When the input area 102 has been displayed or is being displayed, the user terminal 100 can obtain the height of the input area 102, and immediately control the virtual input box to dynamically follow the displayed input area 102 to move to an area at the top of the input area 102 and close to the center of the operation interface through a smooth animation. Next, the user terminal 100 hides the virtual input box and redisplays the previously hidden input box 101 in the area where the hidden input box 101 is located.

In summary, according to the method for displaying and controlling an input box provided in this embodiment of the present invention, during the course of displaying the input area 102 and by way of hiding the input box 101, the user terminal 100 is made to consider that the input area 102 will not block the input box 101. As a result, during the course of displaying the input area 102, the operation interface will not be affected by the input area 102 to have the issue of being compressed or shifted in response. At the same time, when the input box 101 is hidden, a virtual input box corresponding to the input box 101 is generated in the area where the original input box 101 is located. When the process of displaying the input box 102 is completed, the virtual input box is smoothly moved to a predetermined area, and then the input box 101 is redisplayed in this area. In this way, the entire process of movement is very smooth, and the user experience will not be affected by displaying the input area 102.

Second Embodiment

Figure 5:
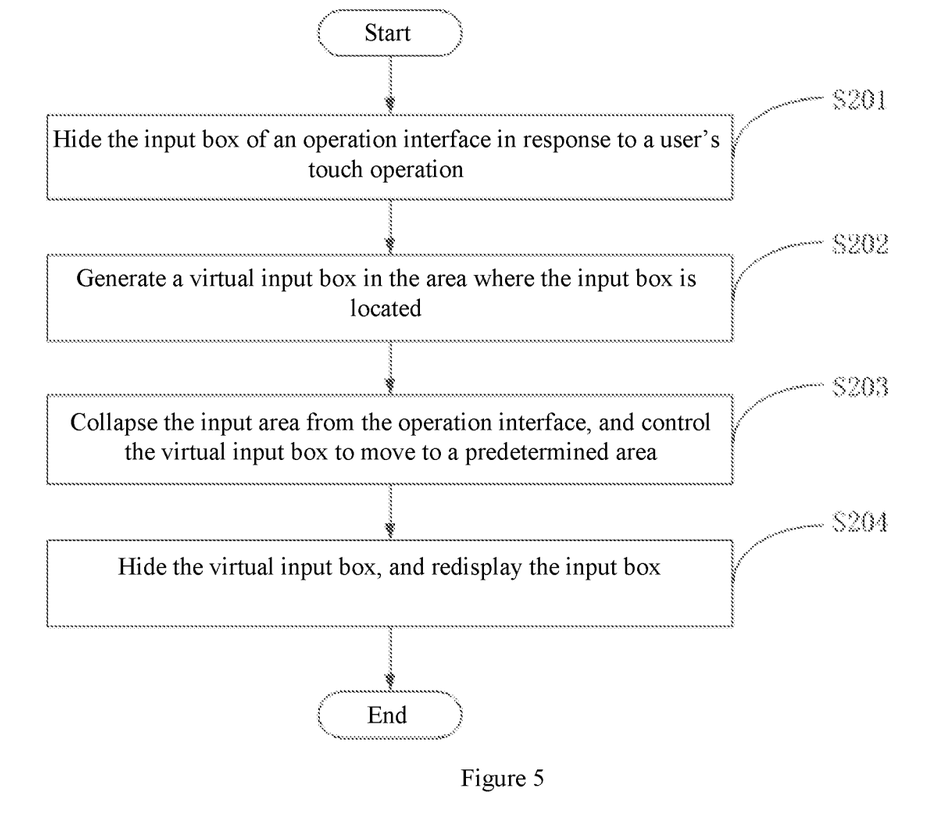
FIG. 5 is a flow chart of the method for displaying and controlling an input box provided in a second embodiment of the present invention.

In reference to FIG. 5, which is a flow chart of the method for displaying and controlling an input box provided in another embodiment of the present invention, it can be seen that the method provided in this embodiment is applicable to a scenario in which the input area 102 of the operation interface is in a displaying state. The specific process shown in FIG. 5 will be described in detail below.

Step S201, hide the input box 101 of an operation interface in response to a user's touch operation.

In this embodiment of the present invention, the input area 102 of the operation interface is in a displaying state. The operation interface is provided with a control element for collapsing the input area 102. The control element may be disposed in any area other than the input area 102 and the input box 101. When a user touches the control element provided on the operation interface, the user terminal 100 responds to the touch operation and hides the input box 101.

Step S202, generate a virtual input box in the area where the input box 101 is located.

After the input box 101 is hidden, the user terminal 100 generates a virtual input box consistent with the original hidden input box 101 in size, shape, color, and so on, in the area where the input box 101 hidden by the operation interface is located.

Step S203, collapse the input area 102 from the operation interface, and control the virtual input box to move to a predetermined area.

After the virtual input box is generated, the user terminal 100 collapses the input area 102 from the operation interface. The process of collapsing the input area 102 may be a process in which the input area is collapsed from the operation interface in a way of sliding pop-up or color gradient deepening. For example, the input area 102 is gradually collapsed towards the bottom or one side of the operation interface, and eventually the input area 102 is completely collapsed.

Since the input box 101 has been hidden, in the process of collapsing the input area 102, the user terminal 100 determines that the input area 102 will not block the input box 101. Therefore, when the input area 102 is collapsed, the operation interface will not have an issue of compression or shift in response.

During or after the process in which the input area 102 is collapsed, the user terminal 100 controls the virtual input box to dynamically move to a predetermined area through a smooth animation. Preferably, the predetermined area is an area in the center of the operation interface, so as to allow a user to easily view it.

It should be noted that if the virtual input box is controlled to moves to a predetermined area during the process in which the input area 102 is being collapsed, it should be ensured that the virtual input box and the input area 102 do not overlap or block each other as much as possible, so as to avoid affecting the user experience effect.

In addition, since the input area 102 has been collapsed, it is impossible for the input area 102 to block the input frame 101. Therefore, during or after the process in which the input area 102 is collapsed, the user terminal 100 may also control the virtual input box to dynamically move to any area on the operation interface through a smooth animation.

Step S204, hide the virtual input box, and redisplay the input box 101.

After the virtual input box moves to the predetermined area, the user terminal 100 hides the virtual input box and redisplays the previously hidden input box 101 on the operation interface.

It should be noted that the area where the hidden input box 101 is redisplayed and the predetermined area to which the virtual input box is moved may be either the same or different. In this embodiment of the present invention, the re-displayed area for the hidden input box 101 is the same as the predetermined area to which the virtual input box is moved, and thus, visually speaking, it seems that the input box 101 moves smoothly from the original area to the predetermined area.

In summary, according to the method for displaying and controlling an input box provided in this embodiment of the present invention, during the course of collapsing the input area 102 and by way of hiding the input box 101, the user terminal 100 is made to consider that the input area 102 will not block the input box 101. As a result, during the course of collapsing the input area 102, the operation interface will not be affected by the input area 102 to have the issue of being compressed or shifted in response. At the same time, when the input box 101 is hidden, a virtual input box corresponding to the input box 101 is generated in the area where the original input box 101 is located. During or after the process of collapsing the input box 102, the virtual input box is smoothly moved to a predetermined area, and then the input box 101 is redisplayed in this area. In this way, the entire process of movement is very smooth, and the user experience will not be affected by collapsing the input area 102.

Third Embodiment

Figure 6:
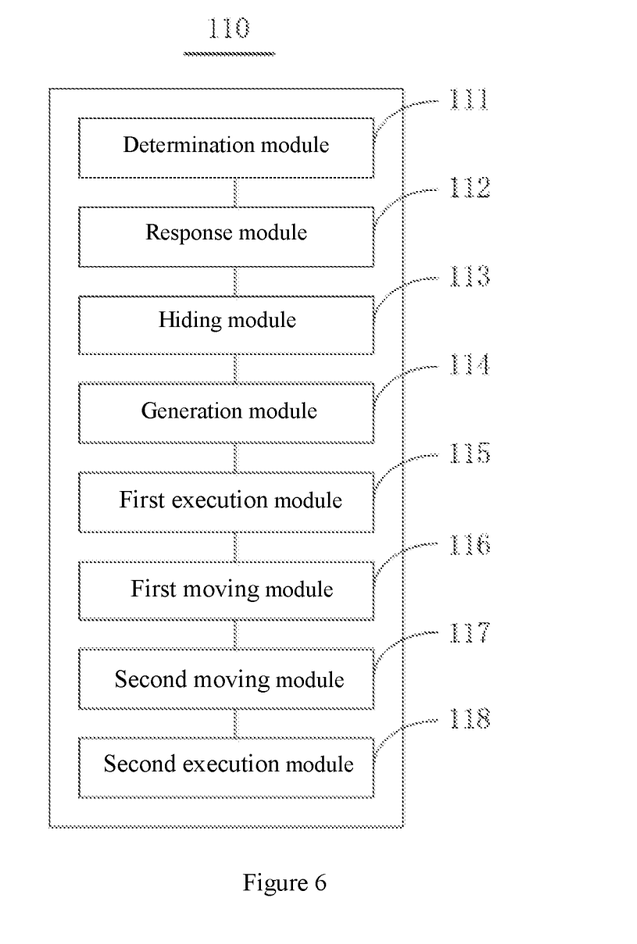
FIG. 6 is a view of the functional modules of the apparatus for displaying and controlling an input box provided in an embodiment of the present invention.

In reference to FIG. 6, which is a view of the functional modules of the apparatus 110 for displaying and controlling an input box provided in an embodiment of the present invention, it can be seen that the apparatus 110 for displaying and controlling an input box includes a determination module 111, a response module 112, a hiding module 113, a generation module 114, a first execution module 115, a first moving module 116, a second moving module 117, and a second execution module 118.

The determination module 111 is used for determine whether the operation interface has started the dynamic keyboard function.

The response module 112 is configured to respond to the touch operation from a user. The hiding module 113 is configured to hide the input box 101 of the operation interface in response to the touch operation from the user.

Specifically, after an application is logged in, an operation interface for interacting with the user is displayed on the touch screen 180 of the user terminal 100. If the input area 102 is in a collapsed state, when a user touches the input box 101 in the operation interface, the user terminal 100 responds to the touch operation through the response module 112 and hides the input box 101 through the hiding module 113. If the input area 102 is in a displaying state, when the user touches the control element for collapsing the input area 102 on the operation interface, the user terminal 100 responds to the touch operation through the response module 112 and hides the input through the hiding module 113.

It is to be understood that the response module 112 may be configured to execute the sub-step of responding to the user's touch operation in steps S101 and S201. The hiding module 113 may be used to execute the sub-step of hiding the input box 101 from the operation interface in steps S101 and 5201.

The generation module 114 is configured to generate a virtual input box in an area where the input box 101 is located after the input box 101 on the operation interface is hidden.

Specifically, after the input box 101 is hidden by the hiding module 113, the user terminal 100, through the generation module 114, generates, in the area where the input box 101 hidden from the operation interface is located, a virtual box consistent with the original hiding input box 101 in size, shape, color, and the like.

It is to be understood that the generation module 114 can be configured to execute the above steps S102 and S202.

The first execution module 115 is configured to display or collapse the input area 102 on the operation interface.

Specifically, if the input area 102 is in a collapsed state, the user terminal 100 generates a virtual input box through the generation module 114 in the area where the input box 101 is located, and then the user terminal 100, through the first execution module 115, displays the input area 102 for user input on the operation interface, where the process of displaying the input area 102 may be a process in which the input area is displayed in a specific area of the operation interface in a way of sliding pop-up or color gradient deepening. On the other hand, if the input area 102 is in a displaying state, the user terminal 100 generates a virtual input box in the area where the input box 101 is located through the generation module 114, and then the user terminal 100, through the first execution module 115, collapses the input area 102 from the operation interface, where the process of collapsing the input area 102 may be a process in which the input area is collapsed in a way of sliding pop-up or color gradient deepening.

It is to be understood that the first execution module 115 may be configured to execute the sub-step of displaying the input area 102 on the operation interface in the above step S103, and the sub-step of collapsing the input area 102 from the operation interface in step S203.

The first moving module 116 is configured to control the virtual input box to move following the input area 102 according to the height of the input area 102 when displaying the input area 102.

Specifically, when the input area 102 is displayed by the first execution module 115, the user terminal 100 may obtain the height of the input area 102 and immediately control the virtual input box to dynamically follow the displayed input area 102 through the first moving module 116 to move to a predetermined area through a smooth animation.

It is to be understood that the first moving module 116 may be configured to execute the sub-step of controlling the virtual input box to move following the input area 102 according to the height of the input area 102 in the above step S103.

The second moving module 117 is configured to control the virtual input box to move to a predetermined area when the input area 102 is collapsed from the operation interface.

During or after the input area 102 is being collapsed, the user terminal 100 controls the virtual input box to dynamically move to a predetermined area through a smooth animation via the second moving module 117. Preferably, the predetermined area is an area in the central part of the operating interface, so as to allow users to view it easily.

It is to be understood that the second moving module 117 may be configured to execute the sub-step of controlling the virtual input box to move to a predetermined area in step S203.

The hiding module 113 is further configured to hide the virtual input box after the virtual input box is moved.

It is to be understood that the hiding module 113 may also be configured to execute the sub-step of hiding the virtual input box in the above steps S104 and S204.

The second executing module 118 is configured to re-display the input box 101.

It is to be understood that second execution module 118 may be configured to execute the sub-step of re-displaying the input box 101 in the above steps S104 and S204.

In summary, according to the apparatus 110 for displaying and controlling an input box provided in this embodiment of the present invention, during the course of displaying or collapsing the input area 102 and by way of hiding the input box 101, the user terminal 100 is made to consider that the input area 102 will not block the input box 101. As a result, during the course of displaying or collapsing the input area 102, the operation interface will not be affected by the input area 102 to have the issue of being compressed or shifted in response. At the same time, when the input box 101 is hidden, a virtual input box corresponding to the input box 101 is generated in the area where the original input box 101 is located. During (or after) the process of displaying or collapsing the input box 102, the virtual input box is smoothly moved to a predetermined area, and then the input box 101 is redisplayed in this area. In this way, the entire process of movement is very smooth, and the user experience will not be affected by collapsing the input area 102.

In the several embodiments provided in the present application, it should be understood that the disclosed apparatuses and methods may also be implemented in other manners. The embodiments od apparatus described above are merely exemplary. For example, the flow charts and block diagrams in the accompanying drawings show the possible system architectures, functions, and operations of the apparatuses, methods, and computer program products according to the embodiments of the present invention. In this regard, each block in the flow chart illustrations or block diagrams may represent a module, a section of a program, or a portion of a code, where the module, section of a program, or a portion of a code may include one or more executable instructions for implementing certain specified logic functions. It should also be noted that in some alternative implementations, the functions noted in the blocks may occur out of the order indicated in the figures. For example, two consecutive blocks may in fact be executed substantially in parallel, and sometimes they may also be executed in a reverse order, depending on the specific function involved. It is also to be noted that each block of the block diagrams and/or flow chart, as well as combinations of blocks in the block diagrams and/or flow chart, may be implemented by special purpose hardware-based systems that perform certain specified functions or actions, or may be implemented using a combination of dedicated hardware and computer instructions.

In addition, the functional modules in the embodiments of the present invention may be integrated together to form a single part, or each of these modules may exist separately, or two or more modules may be integrated to form an independent part.

In the case that the function is implemented in the form of a software functional module and is sold or used as an independent product, the function may be stored in a computer-readable storage medium. Based on this understanding, the technical solution of the present invention, or the part of the technical solution of the present invention making significant contribution to the prior art, or a portion of the technical solution of the present invention, substantially can be achieved in the form of a software product. The computer software product can be stored in a storage medium, including certain instructions, to enable a computer device (which may be a personal computer, a server, a network device, or the like) to execute all or part of the steps of the method according to each embodiment of the present invention. The foregoing storage medium includes various media capable of storing program code such as a USB flash disk, a removable hard disk, a read-only memory (ROM), a random access memory (RAM), a magnetic disk, or an optical disk. It should be noted that, in this application, relational terms such as first and second are merely used to distinguish one entity or operation from another entity or operation, and do not necessarily require or imply that the entity or operation actually has such a relationship or order. Moreover, the terms "comprise", "include", "contain" or any other variations thereof are intended to cover a non-exclusive inclusion such that a process, method, article, or apparatus that includes a list of elements includes not only those elements but also the elements that are not listed or the elements that are inherent to such process, method, article, or device. Without further limitations, an element limited by the statement "comprising a . . . " does not exclude the existence of additional identical elements in the process, method, article, or apparatus that includes the element.

The foregoing descriptions are merely a few preferred embodiments of the present invention and are not intended to limit the present invention. For those skilled in the art, the present invention may also have various modifications and changes. Any modification, equivalent replacement, improvement, etc. within the spirit and principle of the present invention should be included in the protection scope of the present invention. It should be noted that similar reference numbers and letters designate similar terms in the figures, and therefore, an article that has been defined in a drawing will not be defined or explained again in any subsequent drawings.

As mentioned above, the foregoing descriptions are merely a few specific embodiments of the present invention, but the protection scope of the present invention is not limited thereto. Anyone skilled in the art may easily understand that changes and substitutions within the technical scope disclosed in the present invention should also be covered by the protection scope of the present invention. Therefore, the protection scope of the present invention should be defined by the claims of the present application.

What is claimed is:

1. A method for displaying and controlling an input box associated with a user terminal with a touch screen, the method for displaying and controlling the input box comprising:
    causing the input box to hide from a first area on an operation interface in response to a user's touch operation;
    subsequent to causing the input box to hide from the first area, generating a virtual input box at the first area on the operation interface;
    causing one of displaying or collapsing an input area on the operation interface; and
    causing the input box to redisplay on the operation interface, comprising:
        causing the virtual input box to hide from a second area of the operation interface; and
        causing the input box to display in the second area.

2. The method for displaying and controlling the input box according to claim 1, wherein the method further comprises:
    subsequent to generating the virtual input box in the first area, displaying the input area on the operation interface; and
    controlling the virtual input box to move dynamically following the input area according to a height of the input area.

3. The method for displaying and controlling the input box according to claim 1, wherein the method further comprises:
    subsequent to generating the virtual input box in the first area, collapsing the input area from the operation interface; and
    controlling the virtual input box to move dynamically to the second area.

4. An apparatus for displaying and controlling an input box associated with a user terminal with a touch screen, the apparatus comprising a processor and a non-transitory memory comprising program code, the non-transitory memory and the program code being configured to, with the processor, cause the apparatus to at least:
    cause the input box to hide from a first area on an operation interface in response to a user's touch operation;
    subsequent to causing the input box to hide from the first area, generate a virtual input box at the first area on the operation interface;
    cause one of displaying or collapsing an input area on the operation interface; and
    cause the input box to redisplay on the operation interface, wherein the non-transitory memory and the program code are configured to, with the processor, cause the apparatus to:
        cause the virtual input box to hide from a second area of the operation interface; and
        cause the input box to display in the second area.

5. The apparatus for displaying and controlling the input box according to claim 4, wherein the non-transitory memory and the program code are further configured to, with the processor, cause the apparatus to:
    subsequent to generating the virtual input box in the first area, display the input area on the operation interface; and
    control the virtual input box to move dynamically following the input area according to a height of the input area.

6. The apparatus for displaying and controlling the input box according to claim 4, wherein the non-transitory memory and the program code are configured to, with the processor, cause the apparatus to further:
    subsequent to generating the virtual input box in the first area, collapse the input area from the operation interface; and
    control the virtual input box to move dynamically to a predetermined area.

7. A computer program product for displaying and controlling an input box associated with a user terminal with a touch screen, the computer program product comprising a computer-readable storage medium having a program code stored therein, the program code is configured to:

cause the input box to hide from a first area on an operation interface in response to a user's touch operation;

subsequent to causing the input box to hide from the first area, generate a virtual input box at the first area on the operation interface;

cause one of displaying or collapsing an input area on the operation interface; and cause the input box to redisplay on the operation interface, wherein the program code is configured to:
  cause the virtual input box to hide from a second area of the operation interface; and
  cause the input box to display in the second area.

8. The computer program product for displaying and controlling the input box according to claim 7, wherein the program code is further configured to:
  subsequent to generating the virtual input box in the first area, display the input area on the operation interface; and
  control the virtual input box to move dynamically following the input area according to a height of the input area.

9. The computer program product for displaying and controlling the input box according to claim 7, wherein the program code is further configured to:
  subsequent to generating the virtual input box in the first area, collapse the input area from the operation interface; and
  control the virtual input box to move dynamically to the second area.

* * * * *